Figure 2:
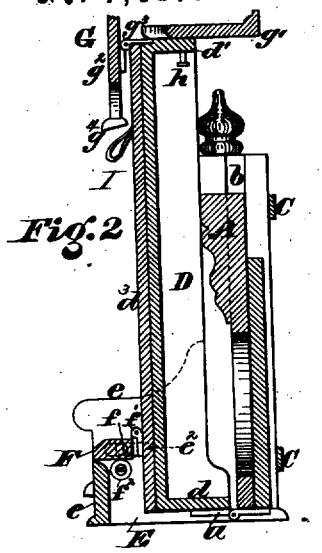

F. CAULIER.

Assignor by mesne Assignments to the New England Wardrobe Bedstead Co.

WARDROBE-BEDSTEADS.

No. 7,817. Reissued July 31, 1877.

Witnesses

Saml. J. Van Hoevenberg

J. B. Connolly

Inventor

Frederick Caulier

By Connolly Bros.

Attorneys

N. PETERS, PHOTO-LITHOGRAPHER, WASHINGTON, D. C.

UNITED STATES PATENT OFFICE.

FREDERICK CAULIER, OF PHILADELPHIA, PENNSYLVANIA, ASSIGNOR, BY MESNE ASSIGNMENTS, TO THE NEW ENGLAND WARDROBE BEDSTEAD COMPANY.

IMPROVEMENT IN WARDROBE-BEADSTEADS.

Specification forming part of Letters Patent No. 183,367, dated October 17, 1876; Reissue No. 7,817, dated July 31, 1877; application filed June 9, 1877.

*To all whom it may concern:*

Be it known that I, FREDERICK CAULIER, of Philadelphia, in the county of Philadelphia, State of Pennsylvania, have invented certain Improvements in Wardrobe-Bedsteads, of which the following is a specification:

The object of my invention is to provide an article of furniture of that class known as wardrobe-bedsteads, which shall be of more simple and perfect construction than any heretofore produced.

My invention consists in the peculiar construction and combination of parts hereinafter more fully set forth, having reference particularly to the combination of a movable fulcrum for the body or folding part of the bed, which is hinged to a bar arranged to move in guides or ways to and from the head-board when said body is being raised and lowered, with a sliding head-board which rises when the body is lowered and falls when the body is raised.

Referring to the accompanying drawing, A represents the head-board, arranged to slide vertically in grooves *b b* formed in the posts B B. C C are transverse connecting-bars, which prevent the posts B B from spreading apart, and which serve to keep said posts the proper distance asunder. D is the body or bottom of the bed, composed essentially of the end rails $d$ $d^1$, side rails $d^2$ $d^2$, and bottom board $d^3$. The end rail $d$ is connected to the head-board A by hinges $a$, so that when the body is tilted or folded said head-board will move vertically in the posts B B, thus forming a counter-balance for said body. E represents a foot-piece projecting outwardly from the posts B B, and formed of the side brackets *e e* and cross-board $e^1$. F is the lid or top of the foot-piece E, and is composed of a bar having journals *f f*, which move in guides formed in the sides *e e* of the foot-piece E. Said journals *f f* may be simply pins, though anti-friction rollers, sustained upon suitable shafts, are preferred, as affording a more easy movement. The bar F is connected to the body D by means of hinges $f'$ $f'$, so that when said body is raised or lowered, as hereinafter set forth, said bar F will move in or out to or from the head-board A, its journals *f f* traveling in the guides $e^2$.

By this arrangement the journals *f f* form the fulcra or pivots of the bottom or body D, and, as these are movable, a more perfect arrangement and movement is obtained than if they were rigid or fixed.

Figure 1:
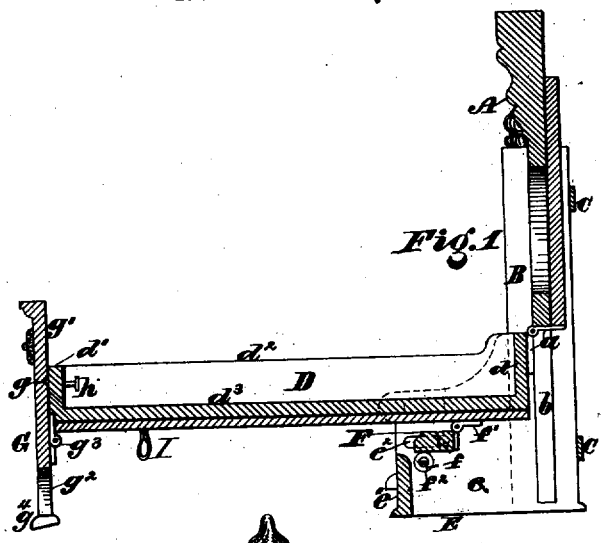
Figure 3:
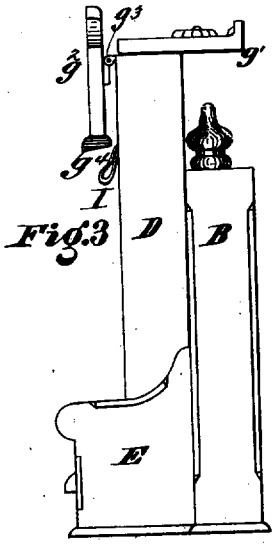
Figure 4:
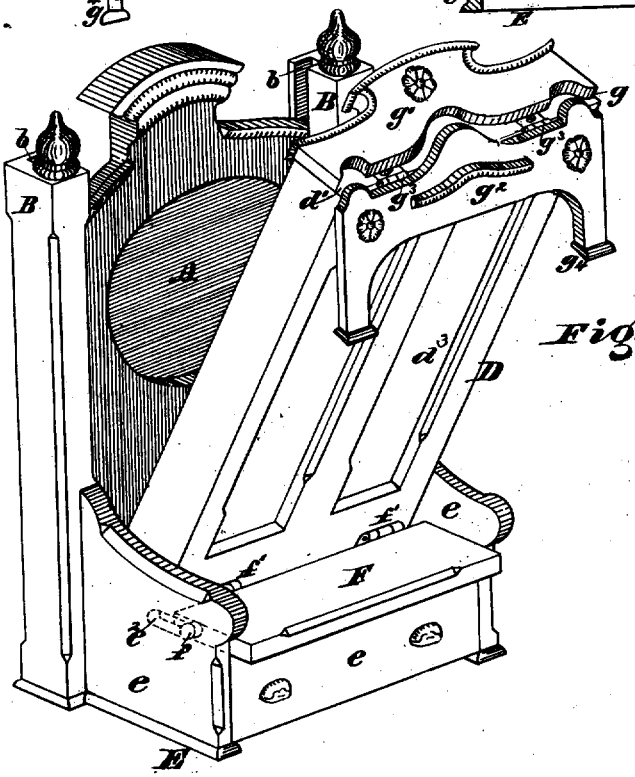

This will be better understood by reference to Figs. 1 and 2 of the accompanying drawing. In Fig. 1 the bedstead is represented as extended—that is, with the body D turned down ready for occupancy. In this figure it will be observed that the end rail $d$ is almost flush with the head-board A, the board F having moved toward the posts B B until its journals *f f* have reached the innermost limit of the guides $e^2$, in which they move. In Fig. 2 the body D is represented as folded or turned up, so as to cause the article to simulate a wardrobe. The edge of the end rail $d$ still remains close to the head-board A, while the bar F will be found to have moved away from the posts B B until its journals *f f* have reached the outermost limits of the guides $e^2$ in which they move.

As will be plainly observed, the head-board A has a vertical movement in a straight line. The body D has a circular or swinging motion, moving from a horizontal to a perpendicular position, and vice versa. These two parts, the head-board and body, being connected by a hinge, it would be impossible to obtain the vertical and circular or swinging motions described if the body turned on a fixed fulcrum. But by hinging the said body to the bar F and giving play to the latter, as described, so as to allow it a movement to and from the posts B B, thus constantly changing the position of the fulcra of the body, the latter accommodates itself readily and without any straining or binding to the vertical movement of the head-board.

$f^2$ represents anti-friction rollers sustained on the side brackets $c$, and on which the back part of the bar F rests and moves. G represents the foot-board of the bed, which is divided horizontally at $g$ into two sections, $g^1$ and $g^2$. The section $g^1$ is fast to the foot or end rail $d^1$, so that said section shall be vertical when the body is lowered, and horizontal when said body is raised. The section $g^2$, on the contrary, is hinged to the body at $g^3$, so that it shall always occupy a vertical position, whether said body be lowered or extended for use or be elevated when not in use. *h h* are pins or studs for retaining the mattress in place when the bed is elevated. The lower extremities of the feet $g^4$ should be beveled, as shown, to prevent their being turned in under the body D when the latter is in the horizontal position required for occupancy. I represents a handle for convenience in raising and lowering the body D.

The clothing and pillows are intended to remain between the body and head-board when the former is elevated, there being ample space for that purpose.

To avoid wear, iron shoes or plates may be inserted in the grooves $e^2$ $e^2$, and on the under side of the bar F above the rollers $f^2$.

What I claim as my invention is—

1. The combination, with the tilting body D of a wardrobe-bedstead, of a bar, F, hinged to the said body, and arranged to move to and from the head-board, as described, when said body is being raised and lowered, as set forth.

2. The combination of sliding head-board A, and tilting body D, said body turning on pivots or fulcra which have liberty of movement to and from the vertical line of said head-board when the body is raised or lowered, as set forth.

3. The combination of sliding head-board A, tilting body D, and bar F, having hinged connections at *a* and $f^1$, the bar F being arranged to move in ways or guides $e^2$, so to accommodate the swinging or rotary motion of the body to the vertical motion of the head-board, as set forth.

4. The head-board and body of a wardrobe-bedstead united by a hinged connection, and so combined and arranged that the former counterbalances the latter, substantially as shown and described.

5. In combination with the foot-piece E, the bar F, hinged to the body D, substantially as shown and set forth.

6. The sliding head-board A, grooved posts B B, foot-piece E, and hinged sliding bar F, combined and arranged for use, and operating substantially as shown and described.

7. In combination with bar F, hinged to the body D, the anti-friction rollers $f^2$ $f^2$, arranged to move on sides *e e* of the foot-piece E, substantially as shown and described.

In testimony that I claim the foregoing I have hereto set my hand this 5th day of April, A. D. 1877.

FREDERICK CAULIER.

Witnesses:

CHARLES A. BOOTH,
M. DANL. CONNOLLY.